United States Patent [19]

Muller

[11] Patent Number: 4,825,397
[45] Date of Patent: Apr. 25, 1989

[54] LINEAR FEEDBACK SHIFT REGISTER CIRCUIT, OF SYSTOLIC ARCHITECTURE

[75] Inventor: Marc Muller, Clamart, France

[73] Assignee: Schlumberger Industries S.A., Montrouge, France

[21] Appl. No.: 64,482

[22] Filed: Jun. 22, 1987

[30] Foreign Application Priority Data

Jun. 23, 1986 [FR] France ................... 86 08998

[51] Int. Cl.⁴ ............................................. G06F 15/31
[52] U.S. Cl. ................................................. 364/724.17
[58] Field of Search ........... 364/715, 724, 754, 715.08, 364/724.17

[56] References Cited

U.S. PATENT DOCUMENTS

| 3,665,171 | 5/1972 | Morrow | 364/724 |
| 3,912,917 | 10/1975 | Nussbaumer | 364/724 |
| 4,369,499 | 1/1983 | Northam | 364/724 |
| 4,546,445 | 10/1985 | Haugon | 364/728 |

Primary Examiner—David H. Malzahn
Attorney, Agent, or Firm—Sanford J. Asman

[57] ABSTRACT

This linear feedback shift register (LFSR) circuit having systolic architecture comprises N cells (C1 to CN) each of which includes an upstream register (e.g. RGE1l), two operators (e.g. OP1 and OC1), and a downstream register (e.g. RGS1). The upstream and downstream registers of each cell are serial shift registers, and their total content is equal to the total number of bits constituting each digital sample processed by the circuit.

1 Claim, 4 Drawing Sheets

LINEAR FEEDBACK SHIFT REGISTER CIRCUIT, OF SYSTOLIC ARCHITECTURE

BACKGROUND OF THE INVENTION

The present invention relates to a linear feedback shift register circuit suitable for providing respective digital samples at successive time instants, each of which samples represents a linear combination of prior digital samples and comprises M significant bits together with an optional addition of X sign extension bits, where X may optionally be zero, said circuit comprising N similar cells each of which forms a bit flow path comprising in series between a main input and a main output of said cell: a P-bit upstream register; a weighting operator; a two-input combining operator; and a Q-bit downstream register; with the output from the upstream register and one of the two inputs to the combining operator respectively constituting a secondary output and a secondary input of the cell suitable for being respectively connected to a main input and to a main output of a following cell in the circuit, and with the main output of the first cell being fed back to the main input of said cell in order to allow the digital samples produced to be recirculated.

Linear feedback shift register circuits have been used for several years and are generally known under the English term or its abbreviation "LFSR".

The function of these circuits is to take N initial digital samples, e.g. S1 to SN, and to produce new digital samples generically written Sj, for example, and each represented for j greater than N by the linear combination:

$$Sj = \sum_{i=1}^{N} ki \cdot Sj - i$$

where (ki) constitute a set of N weighting coefficients.

FIG. 1 is a diagram of a first type of prior art LFSR. This LFSR, which does not include all of the features mentioned in the introduction, comprises registers (e.g. RG1 to RG5), weighting operators OP1 to OP5 which are constituted, for example, by multipliers which multiply by respective constant coefficients k1 to k5, and a combining operator OC.

In this LFSR, the bit flow paths which are represented by single lines are constituted, in fact, by paths for parallel bit flow, and are therefore each constituted by a plurality of parallel lines. Similarly, the registers and the operators are parallel-operating registers and operators, i.e. each of them acts on a plurality of bits at a time.

The combining operator OC which is represented diagrammatically as a single adder is not physically constituted in this particular form.

In general, a parallel operator such as OC takes the form of a pyramid of elementary triad operators (i.e. operators having two inputs and one output), as shown in FIG. 2.

Suppose that at instant 0, registers RG1 to RGN contain samples SN to S1.

During the first operating cycle, each digital sample passes from one register to the next register and is simultaneously weighted by the operator OP connected to the output of the register it is leaving; the weighted samples are then simultaneously transmitted to the combining operator OC.

At the end of the operating cycle, the combining operator OC (assumed to be constituted by the FIG. 2 conventional parallel adder) thus provides a digital sample:

$$SN + 1 = \sum_{i=1}^{N} ki \cdot SN + 1 - i$$

which is stored in the register RG1.

Such an LFSR therefore provides the desired function which consists in providing digital samples represented by linear combinations of earlier samples.

However, given the structure of its combining operator OC as shown in FIG. 2, an LFSR of this type is not suitable for being described as an assembly of N similar cells.

This lack of modular structure is a handicap in making an LFSR of this type in the form of very large scale integration (VLSI) circuits. The geometry of the physical location of the elementary triad operators constituting the combining operator OC, and also the transfer time of said operator both depend on the number N of register RG1, RG2, ..., RGN in the circuit.

This drawback is avoided, in conventional manner, by using a structure such as the LFSR structure shown in FIG. 3.

Although such a circuit still does not include all of the features specified in the introduction, it nevertheless provides a modular structure since it comprises an assembly of N similar cells referenced C1 to CN.

Each cell constitutes a parallel bit flow path comprising a series connection of a register such as RG1 to RGN, a weighting operator such as OP1 to OPN, and a combining operator such as OC1 to OCN.

Like the FIG. 1 LFSR, the registers and the weighting and the combining operators operate in parallel, i.e. the single lines shown connecting them to one another in the diagram of FIG. 3 are in fact constituted by M parallel lines where M is the number of bits in each of the digital samples contained in the registers RG1 to RGN.

The FIG. 3 LFSR includes a multiplexer MX enabling the input to the register RG1 to be connected either to an input E to the LFSR circuit or else to the output from the combining operator OC1.

In point of fact, such a multiplexer is also required in the FIG. 1 LFSR, and it has been omitted from FIG. 1 simply for the purpose of simplifying understanding.

During an initialization stage, the multiplexer MX in the FIG. 3 LFSR connects the input E thereof to the register RG1 so as to provide access to this circuit for digital samples S1 to SN which are initially applied to the input E and which, at the end of the initialization stage, occupy respective ones of the registers RGN to RG1. The multiplexer MX is then switched to connect the output from the combining operator OC1 to the input to the register RG1, thereby enabling new digital samples to be generated by circulating the initial samples S1 to SN and by the processing provided by the various operators.

During each calculation cycle, the digital samples stored in the registers RG1 to RGN are simultaneously transmitted to the respective following registers and also to the respective weighting operators OP1 to OPN in which they are multiplied by respective constant coefficients k1 to kN.

Thus, the weighted digital samples are all simultaneously available at the top inputs to the respective operators OC1 to OCN.

The sum of these weighted samples is then returned to the first register RG1 via the parallel multiplexer MX. However, this sample sum becomes available at the bottom input to the multiplexer MX only after the sample weighted by the coefficient kN in the furthest cell from the multiplexer MX has passed through all of the combining operators, i.e. OCN to OC1, and this requires time approximately equal to N times the transfer time through a single combining operator such has OC1.

Consequently, even though the FIG. 3 LFSR has the advantage of modular structure describable as an assembly of N similar cells, it nevertheless retains the drawback of leading to cycle times which depend on the number N of cells.

This dependence of the time required for calculating each cycle as a function of the number of cells can be eliminated, in known manner, by the LFSR shown in FIG. 4.

This LFSR satisfies all of the features specified at the beginning of the present description and represents the closest prior art to the invention.

The FIG. 4 LFSR is described, for example, at page 43 (FIG. 10) of the January 1982 number of the journal "Computer", in an article by H.T. Kung (Carnegie-Mellon University).

As in the FIG. 3 LFSR, the bit flow paths and the operators in the FIG. 4 LFSR are parallel in structure.

Constructionally speaking, the FIG. 4 LFSR differs from the FIG. 3 LFSR solely in that each cell (such as C1 to CN) of the FIG. 4 circuit, instead of comprising a single register (such as RG1 to RGN), comprises a P-bit upstream register (such as RGE1 to RGEN) together with a Q-bit downstream register such as RGS1 to RGSN).

In this prior art, the lengths P and Q of the upstream and downstream registers are equal.

The structural difference between the LFSRs of FIGS. 3 and 4 is accompanied by an operating difference which gives rise to different performance.

In the FIG. 4 LFSR, initialization is performed by alternately injecting via the multiplexer MX a useful digital sample such as S1 to SN and a null sample, i.e. a sample in which all the bits are equal to zero.

Since there are N useful digital samples there are also N null samples such that the initialization stage takes $N+N=2N$ cycles.

Since there are N upstream registers RGE1 to RGEN and N downstream registers RGS1 to RGSN, all of the registers are loaded at the instant at which the initialization phase terminates.

More precisely, at this instant, half of the upstream registers are filled with null samples and the other half of them are filled with samples from the second half of the digital samples S1 to SN, while the downstream registers already contain partial combinations of weighted digital samples.

However, in each cycle each digital sample follows an elementary path which corresponds to the distance between two registers.

In summary, the FIG. 4 LFSR thus has the advantage of a modular structure and also of generating (after its initialization stage) each of the digital samples in a time which is independent of the number N of digital samples being used.

The term of art for such an LFSR is "systolic".

However, this prior LFSR suffers from two drawbacks: the first is that it requires an initialization stage of 2N cycles for N useful samples, and the second is that under stationary conditions it provides a new useful digital sample only on every other cycle since every in-between sample produced is constituted by a null sample.

SUMMARY OF THE INVENTION

In this context, the aim of the present invention is to provide a systolic LFSR which requires an initialization stage of only N cycles for N useful digital samples, and which only produces useful digital samples.

To this end, the LFSR circuit of the present invention for processing digital samples each comprising M significant bits together with an optional addition of X sign extension bits (where X may be 0), and including upstream registers each containing P bits and downstream registers each containing Q bits is essentially characterized in that the upstream and downstream registers in each cell are serial shift registers and in that the sum $P+Q$ of their lengths is equal to the total length $M+X$ of each of the digital samples.

BRIEF DESCRIPTION OF THE DRAWING

Other characteristics and advantages of the invention appear from the following description given with reference to the accompanying drawings, in which.

BRIEF DESCRIPTION OF THE DRAWING

Figure 5:
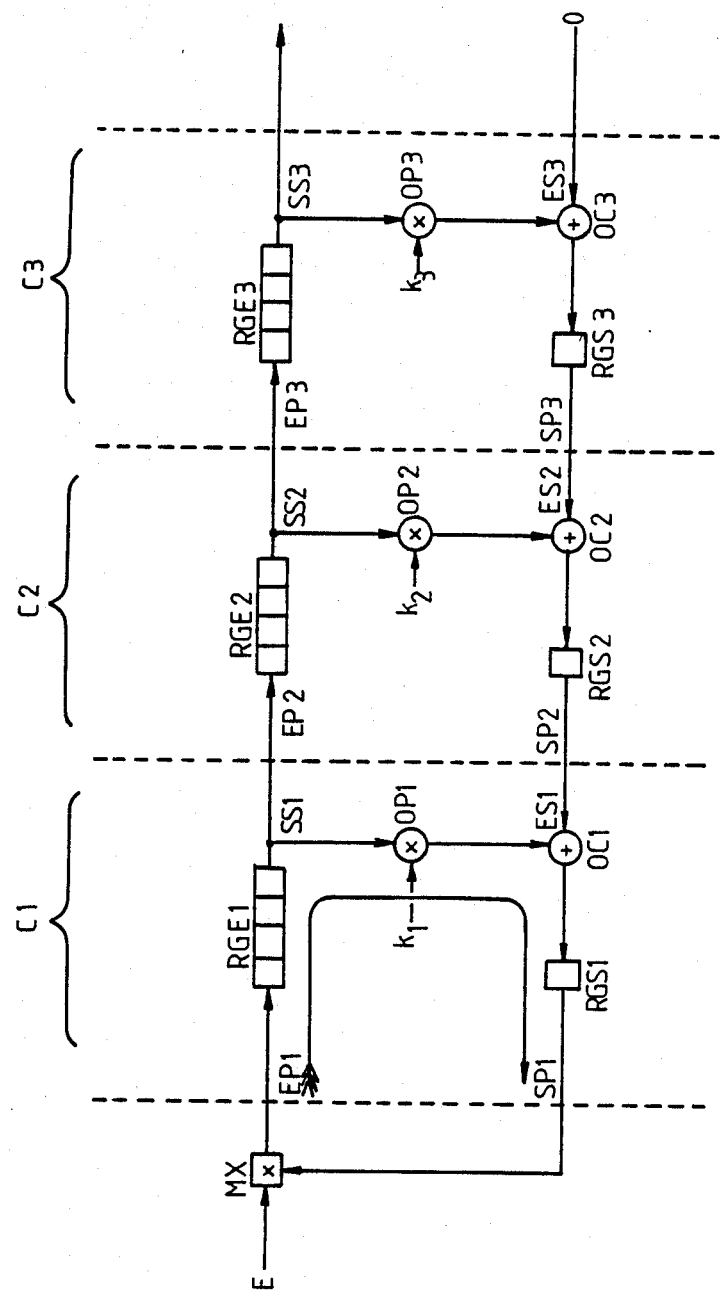
FIG. 5 shows the physical structure of an LFSR circuit in accordance with the invention.

The linear feedback shift register (LFSR) circuit in accordance with the invention and shown in FIG. 5 comprises N similar cells (with N being taken to be equal to 3 in FIG. 5) referenced C1, C2, and C3.

Each cell constitutes a bit flow path symbolized by an arrow in cell C1, and comprises in series between a main input such as EP1, EP2, or EP3, and a main output such as SP1, SP2, or SP3 of said cell: a P-bit upstream register such as RGE1, RGE2, or RGE3; a weighting operator such as OP1, OP2, or O3; a combining operator such as OC1, OC2n or OC3; and a Q-bit downstream register such as RGS1, RGS2, or RGS3. In the example shown in FIGS. 5 and 6, P is equal to 4 and Q is equal to 1.

According to the invention, the bit flow path constituted by each cell is a serial bit path, i.e. the bits flow therealong one behind the other along a single line. In particular, the upstream and downstream registers are serial shift registers, i.e. the bits stored therein constitute a single sequence between the inlet and the outlet to each of these registers.

The LFSR circuit shown in FIG. 5 is intended to provide, at successive instants, respective digital samples $S_j$, each of which is representative of a linear combination of prior digital samples $S_{j-N}$ to $S_{j-1}$.

In particular, the circuit may provide at least one digital sample coming from a combination of the N initial samples (i.e. three samples in the present example) as provided to the circuit at the beginning of its operation.

In accordance with the invention, each of these digital samples comprises a total of P+Q bits (i.e. 4+1=5 in the present example), comprising M significant bits and X sign extension bits which may optionally be omitted (for example M may be equal to 5 and X may be equal to 0).

The weighting operators are typically multipliers, operating, for example, by multiplying the digital sample by constant coefficients such as k1 to kN.

The reason for using the term "weighting operator" rather than the term "multiplier" is that in known manner these operators may operate on mathematical sets other than the set of real numbers for which multiplication is traditionally defined, for example they may operate on a Galois body.

The combining operators OC1 to OCN symbolized by triad operators having two inputs and one output are typically adders.

Like the weighting operators, these combining operators may operate on sets other than the set of real number, for example on a Galois body. They may also, in known manner, include a memory for storing the carry resulting from addition.

The output from the upstream register (RGE1, ..., RGEN) of each cell constitutes a secondary output (SS1, ..., SSN) from the cell, whereas one of the two inputs to the combining operator (OC1, ..., OCN) of each cell constitutes a secondary input (ES1, ..., ESN) to the cell.

In the circuit, the secondary inputs and outputs of each cell other than the last are respectively connected to the main input and output of the following cell. The secondary output SS3 of the last cell is connected to nothing and the secondary input ES3 thereof is connected to permanently receive the value 0.

Figure 4:
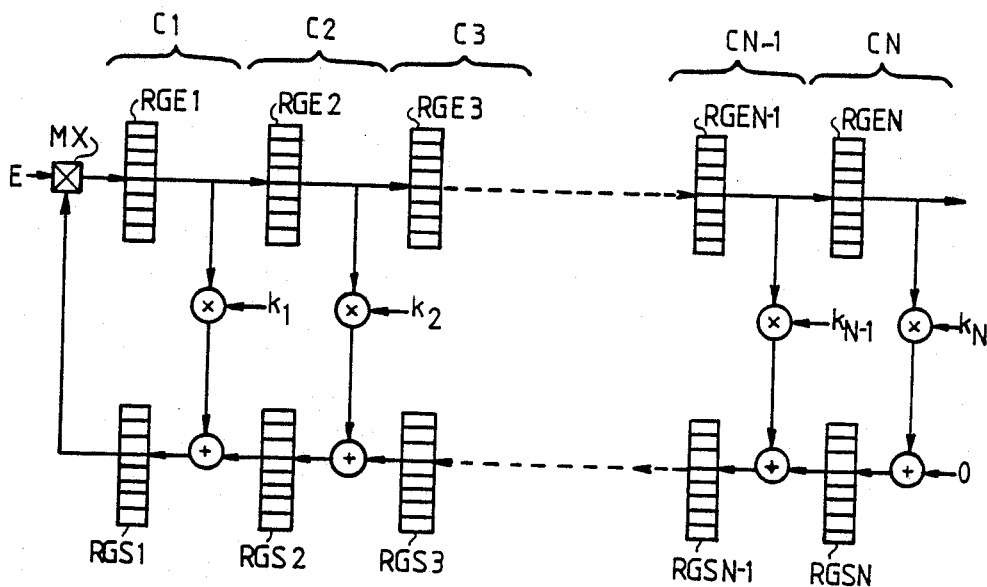

The main output SP1 from the first cell C1 is connected to the main input EP1 thereof via the serial multiplexer MX as in the LFSR of FIG. 4, except insofar as the bit flow path in the FIG. 5 LFSR is a serial path and not a parallel path.

If the coefficients k1, k2, ..., kN are coded on a plurality of bits each, then the weighting operators are operators operating in series-parallel mode since all of the bits of each weighting coefficient k1, k2, ..., kN apply to all of the bits in each digital sample S1, S2, ..., SN, and since the bits of each weighted digital sample are produced one after the other in serial mode.

Serial-parallel weighting operators are well known in the prior art.

Figure 1:
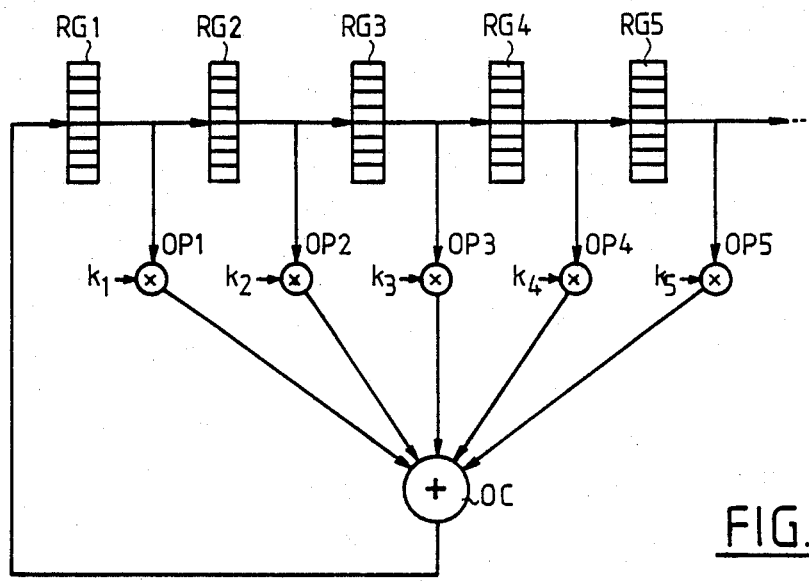
FIGS. 1 to 4 show prior art as described above.

An example of such a serial-parallel operator operating on real numbers is given in FIG. 1 of the article by R. F. Lyon which appears in the April 1976 number of "IEEE Transactions on Communications" at page 418.

Figure 2:
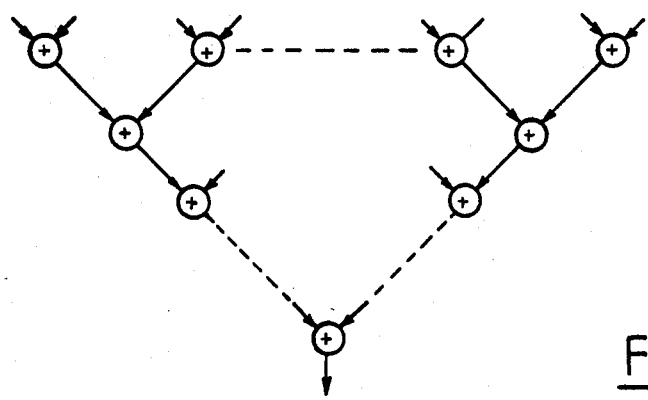
Figure 3:
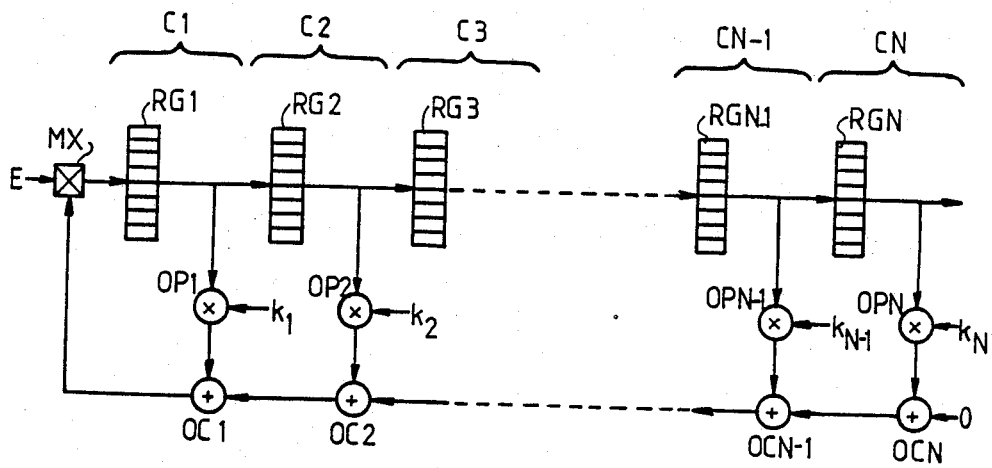

An example of a serial-parallel operator working on a Galois body is given in FIG. 2.16 on page 47 of the book "Algebraic Coding Theory" by Elwyn R. Berlekamp, published by McGraw-Hill Book Company, 1968.

The combining operators OC1, ..., OCN retain a purely serial structure regardless of the number of bits in the coefficients k1, ..., kN.

Figure 6:
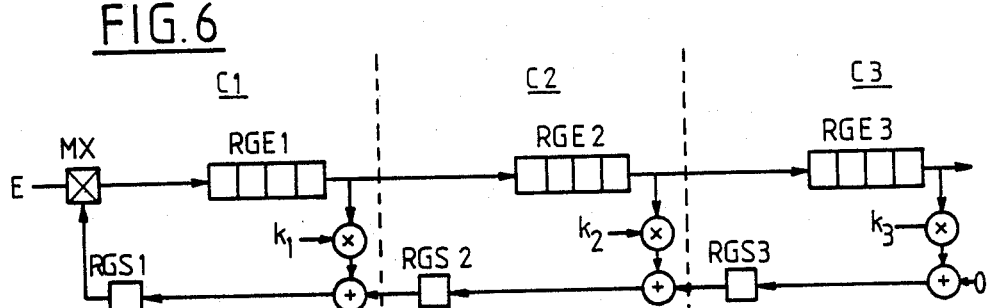
FIG. 6 shows, in addition to said physical structure, the change as a function time of the contents of the shift registers of such an LFSR, thus showing the operation thereof.

The operation of the FIG. 5 LFSR constituting a specific embodiment of the invention is shown in FIG. 6.

In the left-hand column of this figure, T represents time and the flow of time corresponds to moving down FIG. 6 from the top. Numbers 1.1 to 4.2 appear under the letter "T" and correspond to the numbers of successive calculation cycles and steps (with the first digit corresponding to the cycle number and the second digit corresponding to the step number within a cycle).

FIG. 6 is also subdivided horizontally in a manner corresponding to the physical disposition of the circuit.

Going from left to right through columns RGE1, RGE2, and RGE3 corresponds to the progress of the bits of digital samples through the upstream registers of cells C1 to C3 respectively, while movement from right to left through columns RGS3, RGS2, and RGS1 corresponds to the progress of the bits of weighted digital samples through the downstream registers of the cells C3 to C1 respectively.

Time instants 1.1 to 3.5 correspond to the initialization stage of the LFSR. During each cycle, the LFSR receives one of the three 5-bit samples referenced S1, S2, and S3 via the multiplexer MX.

The sample S1 comprises bits S11, S12, S13, S14, and S15 which are provided successively during sets 1 to 5 of the first cycle.

Similar notation is used for samples S2 and S3.

Prior to the initialization stage, the upstream and downstream registers are assumed to contain zeros, or else to contain data which need not be taken into consideration for understanding the operation of the LFSR as explained with reference to FIG. 6.

At the end of the first step of the first cycle (T=1.1), bit S11 is stored in the first of the four bistables in register RGE1 (i.e. in the extreme left-hand bistable in the drawing). At the end of the second step (T=1.2) bit S12 has taken the place of bit S11 which has been moved into the second bistable of RGE1.

The process continues in the same way until the end of the third cycle (T=3.5) which marks the end of the initialization stage.

From the beginning of the first cycle (T=1.5) weighted digital sample bits reach the downstream registers; for example at T=1.5, (S1.k1)1, i.e. the first bit of the product S1.k1, is stored in RGS1; at T=2.1, (S1.k1)2 is stored in RGS1; at T=2.4, (S1.k2)1 is stored in RGS2. However, since these partial results have no effect since the multiplexer isolates RGS1 from RGE1 throughout the entire initialization stage, these partial results are not, in general, marked on FIG. 6.

By way of exception to this general principle, FIG. 6 does show, at time T=3.3, one particular partial result H11=(S1.k3)1 which is constituted by the first bit of the weighted digital sample S1.k3 as stored in RGS3.

This partial result H11 is consolidated at time instant T=3.4 in the form of a new partial result J11 obtained by "adding" (S2.k2)1 to H11 with the result being stored in RGS2.

This partial result J11 is itself consolidated at T=3.5 into a new result L11 which is equal to J11+(S3.k1)1 and is stored in RGS1.

L11 represents the first bit of the linear combination S1.k3+S2.k2+S3.k1 since L11=(S1.k3+S2.k2+S3.k1)1.

At the beginning of the fourth cycle, the multiplexer MX establishes communication between RGS1 and RGE1 and isolates RGE1 from the input E: the bit L11 is therefore stored in the first bistable of RGE1 at the beginning of the fourth cycle.

The following bit L12 which has been prepared meanwhile next occupies the first bistable of RGE1 at time instant 4.2, shifting L11 into the second bistable.

FIG. 6 shows this process in a readily comprehensible form, from which it is easy to see by simple extrapolation that, at time instant 4.5, digital sample $L1 = S1.k3 + S2.k2 + S3.k1$ (which may be noted S4 in order to ensure continuity in notation) will occupy register RGE1 and a portion of register RGE2, with the last bit L15 being located in the first bistable of RGE1 and with the first bit L11 occupying the first bistable of RGE2.

An LFSR in accordance with the invention having completely systolic architecture reduces the initialization stage to a number of cycles equal to the number of digital samples and avoids the need for interleaving useful samples with null samples, thereby doubling the throughput of useful digital samples.

It also has the advantage of making use of components which are serial components or serial-parallel components which generally have a structure which is much less complex than that of components which operate in parallel mode.

I claim:

1. A linear feedback shift register circuit suitable for providing respective digital samples (Sj) at successive time instants, each of which samples represents a linear combination of prior digital samples ($Sj-1$ to $Sj-N$) and comprises M significant bits together with an optional addition of X sign extension bits, where X may optionally be zero, said circuit comprising N similar cells (C1 to CN) each of which forms a bit flow path comprising in series between a main input and a main output (EP1 to EPN, and SP1 to SPN) of said cell: a P-bit upstream register (RGE1 to RGEN); a weighting operator (OP1 to OPN); a two-input combining operator (OC1 to OCN); and a Q-bit downstream register (RGS1 to RGSN); with the output from the upstream register (RGE1 to RGEN) and one of the two inputs to the combining operator (OC1 to OCN) respectively constituting a secondary output and a secondary input (SS1 to SSN, and ES1 to ESN) of the cell suitable for being respectively connected to a main input and to a main output of a following cell in the circuit, and with the main output (SP1) of the first cell being fed back to the main input (EP1) of said cell in order to allow the digital samples produced to be recirculated, the LFSR circuit being characterized in that said upstream registers (RGE1 to RGEN), and said downstream registers (RGS1 to RGSN) of each cell are serial shift registers, and in that the sum P+Q of their lengths is equal to the total length M+X of each of the digital samples.

* * * * *